United States Patent [19]

Appel et al.

[11] Patent Number: 5,377,036
[45] Date of Patent: Dec. 27, 1994

[54] SUPPRESSION OF STRAY LIGHT REFLECTIONS IN A RASTER OUTPUT SCANNER (ROS) USING AN OVERFILLED POLYGON DESIGN

[75] Inventors: James J. Appel, Brighton; John A. Durbin, Webster; John R. Andrews, Fairport, all of N.Y.

[73] Assignee: Xerox Corporation, Stamford, Conn.

[21] Appl. No.: 988,494

[22] Filed: Dec. 10, 1992

[51] Int. Cl.⁵ .............................................. G02B 26/08
[52] U.S. Cl. ...................................... 359/216; 359/65; 359/494
[58] Field of Search ........................ 359/212, 216–219, 359/494, 601, 614, 36–37, 63, 62, 65; 250/234–236; 358/474; 346/108

[56] References Cited

U.S. PATENT DOCUMENTS

| | | | |
|---|---|---|---|
| 4,447,723 | 5/1984 | Neumann | 250/236 |
| 4,941,721 | 7/1990 | Banton et al. | 359/217 |
| 4,978,185 | 12/1990 | Appel | 359/217 |

*Primary Examiner*—Scott J. Sugarman
*Assistant Examiner*—James Phan

[57] ABSTRACT

In an overfilled ROS polygon architecture, stray reflection from facets adjacent the completely filled (illuminated) facet are neutralized by placing an optical isolator in the path of the unwanted stray reflections. In a first embodiment, the isolator comprises a linear polarizer and a quarter wave plate. In a second embodiment, the isolator comprises a liquid crystal quarter wave plate and a cholesteric liquid crystal cell.

7 Claims, 5 Drawing Sheets

SUPPRESSION OF STRAY LIGHT REFLECTIONS IN A RASTER OUTPUT SCANNER (ROS) USING AN OVERFILLED POLYGON DESIGN

The invention relates to a raster output scanning system (ROS) and, more particularly, to an improved optical system for suppressing stray light reflected from polygon facets adjacent to an imaging facet which is illuminated with an overfilled beam.

Digital printers incorporating raster output scanners use a rotating polygon as the scanning element to form modulated scan lines on the surface of a photosensitive medium. In a typical system, a beam, modulated according to an input video signal, is emitted from a light source such as a helium neon or a diode laser. The modulated light is directed through pre-polygon conditioning optics, onto the facets of a rotating polygon. The polygon rotates in the 3 to 30 krpm range, then scans the beam through a post-polygon optical system and images the laser spot as a scan line across the full process width of a photosensitive medium moving in a process direction. In prior ROS systems there are typically three scanning modes. In a first mode, pre-polygon conditioning optics incorporate an underfilled design; e.g. the light from the laser is either collimated, in the case of a diode laser, Or expanded in the case of a gas laser, and collimated to the correct beam width in the fast scan direction on an imaging polygon facet that is smaller than the facet, typically by a factor of approximately 3. The underfilled design has been generally preferred because of a high throughput efficiency and uniform illumination of the imaging facet. A second mode is the overfilled design where the light beam is collimated (laser diode) or expanded (gas laser) to beam width in the fast scan direction on the imaging polygon facet that is larger than the facet by a factor of 3 or so in the fast scan direction. In an overfilled design the requirement for facet size required to produce a given spot size at the image medium is greatly reduced allowing many more facets to be accommodated on the same diameter polygon. This, in turn, permits the scan system to form more scan lines per second with a given polygon motor, or, alternatively, to permit the use of less powerful and less expensive polygon motor drives. The overfilled design has several disadvantages which have heretofore not been completely resolved. The throughput efficiency is relatively low (20%), compared to the 50% efficiency of the underfilled design, and the illumination of the imaging facet is not as uniform as the underfilled design. This illumination problem, however, has been addressed by the techniques disclosed in U.S. Pat. No. 4,941,721. A third mode is where the facet is exactly illuminated by the exposure beam. To enable this mode, a relatively costly and complex facet tracking apparatus must be provided to displace the beam in the direction of rotation of the facet, so that the illumination beam moves in synchronism with the facet.

The overfilled design, in addition to the disadvantages mentioned above, also has a significant problem in the stray reflection of light from facets that are adjacent to the facet that is being fully illuminated to form the scan line at the photosensitive medium. This stray reflected light is reflected back through the pre-polygon optical system where the light either enters the laser by passing through the partially transmitting, partially reflective, front surface of the laser, or it undergoes another reflection, this time from the partially reflective diode laser front surface. If it enters the laser cavity, it can cause the laser output to become unstable. If it is reflected back through the polygon optical system, back onto the imaging facet and then reflected through the post-polygon optical system where it is incident on the image plane, it can form an undesirable light image. There have been attempts in the prior art to reduce the stray light problem. As disclosed in U.S. Pat. No. 4,978,185, a technique is described for coating areas of facets adjacent the imaging facet with a non-reflective material to eliminate the light reflected from the material, which would have been reflected from the material as the stray light. This process may prove to be uneconomical for some systems, since each facet of each polygon must be processed and coated with the non-reflective material with a high degree of accuracy.

According to the present invention, an optical isolator is placed between the laser and the polygon in a location where the stray light beam reflected back from the facets adjacent the imaging facet is absorbed. More particularly, the present invention relates to an optical scanning system which removes unwanted stray light reflections in an overfilled polygon design comprising:

a source of high intensity modulated, polarized, collimated light beams, a polygon scanner having a plurality of light reflecting facets interposed in the optical path between said light beam source and a light sensitive medium, one of said facets being fully illuminated by focused light beams to produce scanning beams which are reflected towards a light sensitive medium, while adjacent facets are at least partially illuminated and reflect at least a portion of the light incident normally thereon as stray light in a reverse direction along said optical path, means for focusing said scanning beams reflected from said fully illuminated facets upon the surface of said light sensitive medium, and isolator means positioned in the optical path between said light beam source and said polygon scanner to prevent the passage therethrough of said stray light being reflected back in a reverse direction from said polygon scanner, along the optical path.

DESCRIPTION OF THE INVENTION

Figure 1:
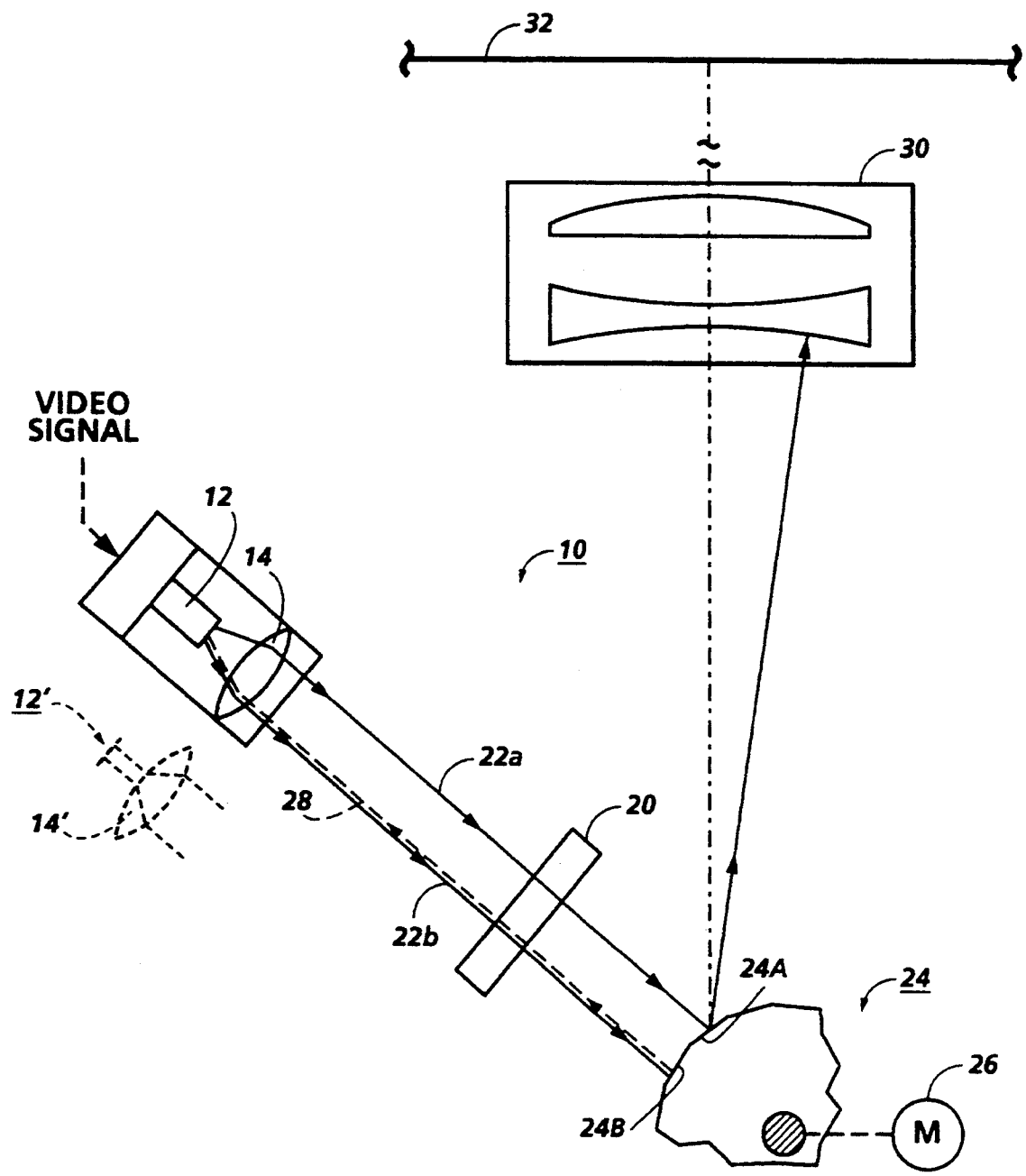
FIG. 1 shows an overfilled polygon ROS design illustrating the stray light problem.

Referring to FIG. 1, there is shown a ROS system 10, having an overfilled polygon facet design. A laser diode 12 serves as the source of high intensity collimated, polarized radiation. The laser diode 12 is self-modulating and the output beam of light is modulated in conformance with the information contained in a video signal. The modulated beam is collimated by collimator assembly 14. Alternately, as shown in dotted form in FIG. 1, a gas laser 12' can be used, which produces a nearly collimated output, but requires beam expansion performed by beam expansion optics 14'. The gas laser output may be linearly polarized or randomly polarized. With either embodiment, the collimated light bundle has a width in the scan direction, which will overfill facets 24A and 24B. Rays 22a and b represent this overfilled image beam. Rays 22a and b pass through cylinder lens 20. Lens 20 shapes the collimated input beam to make it optically correct to compensate for motor polygon induced sagittal beam position (wobble) error. Diode 12, collimator 14 and lens 20 form a pre-polygon optical system. The lens creates a focused beam in the plane of the vertical axis at the polygon, while maintaining the collimation of the beam in the perpendicular or scanning axis. Thus, a collimated light beam is directed across facets 24A, 24B of polygon 24, being rotated by a polygon motor 26. Facet 24A is shown for illustrative purposes as the imaging facet, while facet 24B is an adjacent facet. As the polygon rotates, a portion of the incident light becomes normally incident to adjacent facet 24B at some rotation angle. Light is reflected back along the optical path, as represented by a stray light reflected beam 28, shown as a dashed line. This beam passes through lens 20 and collimator assembly 14 and converges onto the reflective front surface of diode 12 or the front mirror of gas laser 12'. The beam is then partially reflected back along the pre-polygon optical path to scanning facet 24A, and also partially transmitted through the front surface of diode 12 or the gas laser mirror. Light reflected from the diode front surface, or the gas laser front mirror and facet 24A is scanned through a post-polygon optical system which includes fθ imaging lens 30. Lens 30 is designed to provide a linear relationship between the rotation of polygon 24 and the deflection of the scanned beam in the transverse direction onto the surface of a photoreceptor 32 moving in a process direction. The modulated beam forms an image line exposure at photoreceptor 32 surface, which would also include an unwanted spot of illumination caused by the reflection of the stray light beam. In addition, the reflected light reaching the laser diode facet or gas laser front mirror can pass through the facet or front mirror and cause the laser diode or gas laser output to become unstable.

Figure 2:
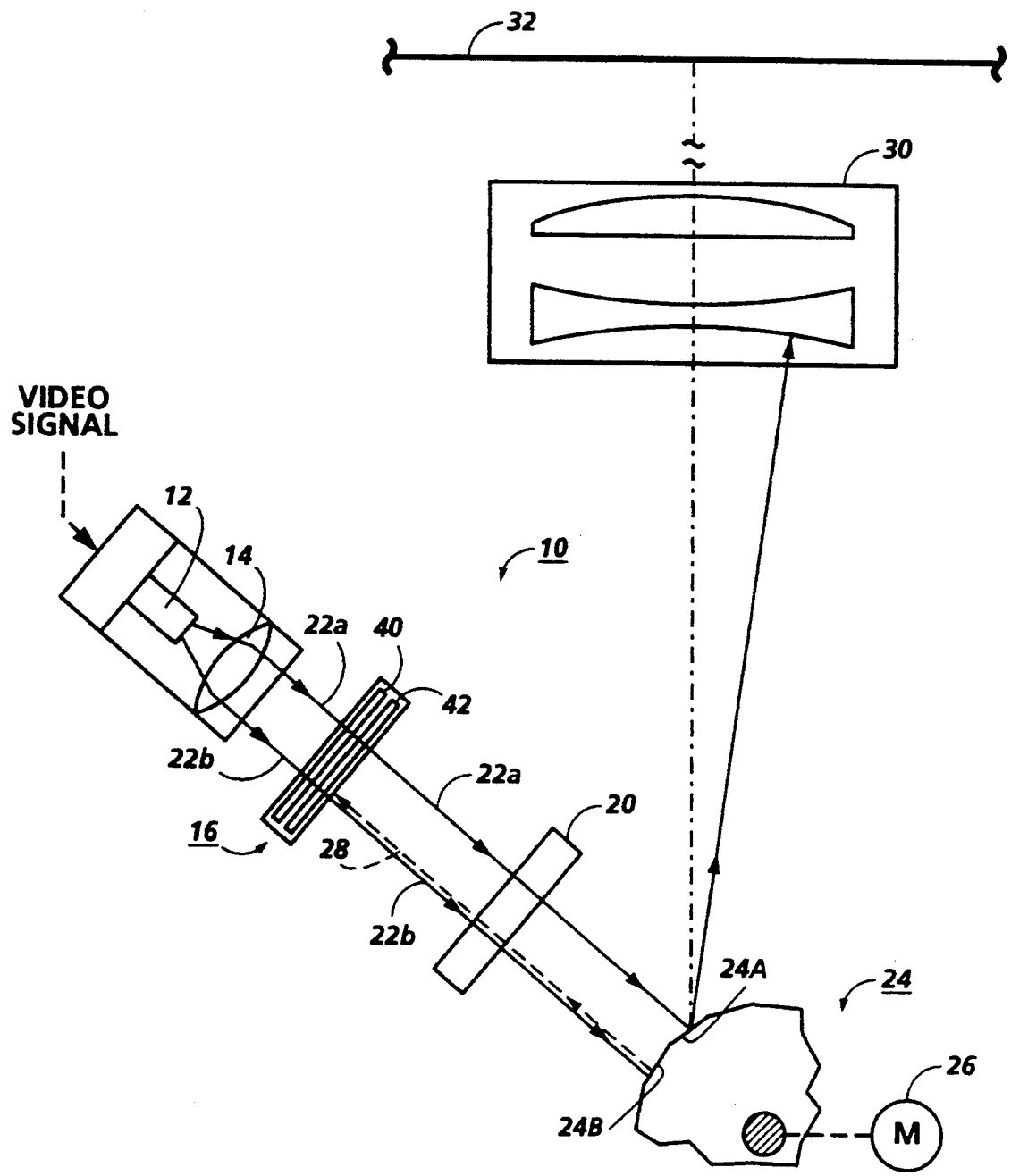
FIG. 2 shows the design of FIG. 1 with a first embodiment of an optical isolator of the present invention located in the pre-polygon optical system.
Figure 3:
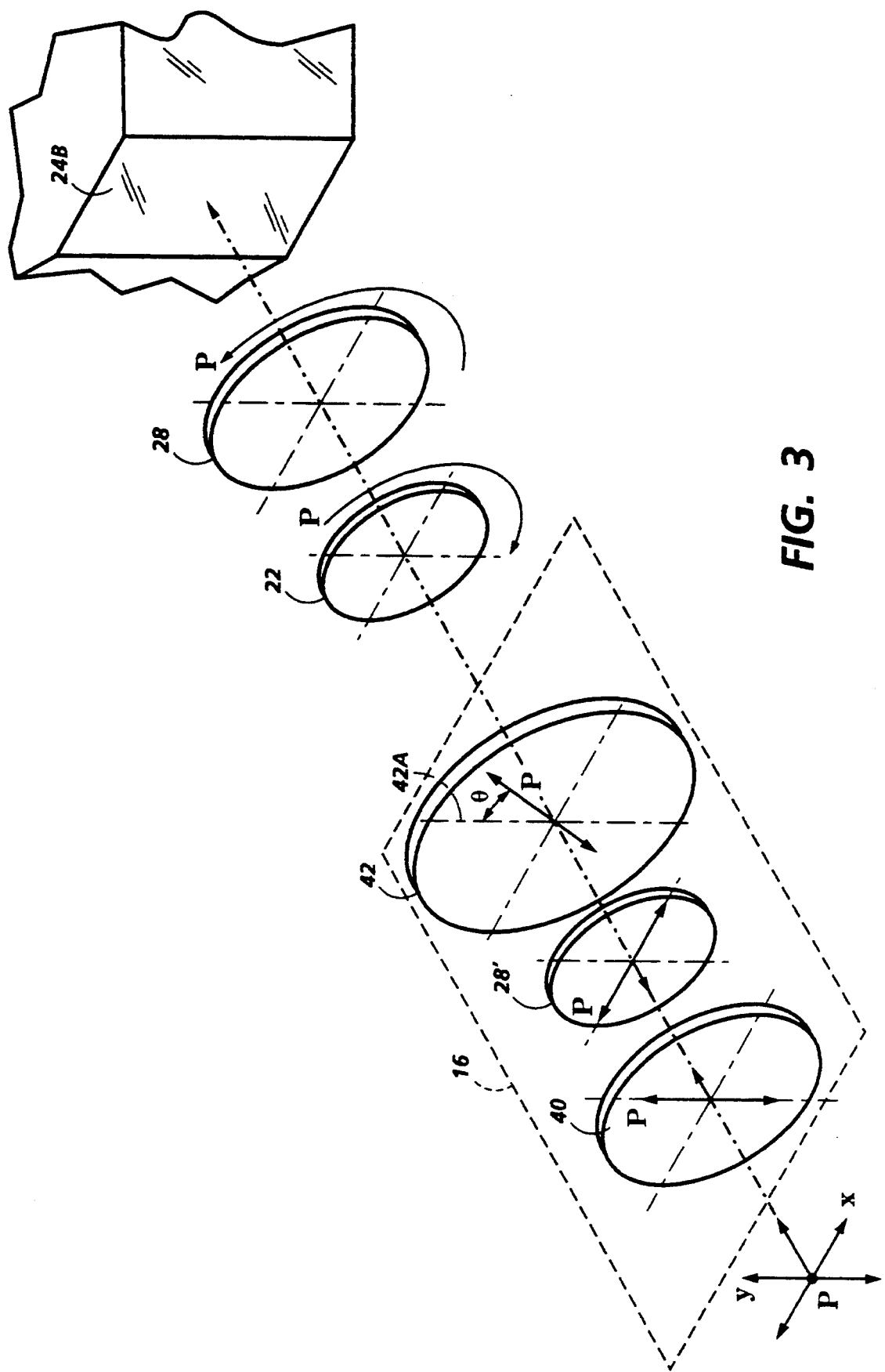
FIG. 3 shows the operation of the optical isolator of FIG. 2 in changing the nature of the polarized light passing through it.

The stray light is prevented from reaching the laser diode or gas laser by operation of the optical isolator 16, shown in FIG. 2 as being positioned in the optical path. Isolator 16 is an optical component which has the function of extinguishing beams which have been reflected back along the optical path from the polygon; e.g. the stray reflections from facet 24B. In a first embodiment, shown in FIGS. 2 and 3, isolator 16 comprises a linear polarizer 40 and a quarter wave plate 42 placed in the path of the collimated beam. FIG. 3 shows an unfolded optical path with all components, save polarizer 40 and plate 42, removed to illustrate the effects of isolator 16 on the stray light. Laser 12 output is linearly polarized and polarizer 40 is placed in the optical path so as to be aligned to the polarization axis of the laser. In the case of the gas laser, the output of the laser may be linearly polarized or randomly polarized. In either, the light is linearly polarized once it passes through polarizer 40. Polarizer 40, in this embodiment, is a polarizing beam splitter cube, but could also be a multilayered dielectric plate polarizer. Other types of polarizers are possible as well. The collimated light from assembly 14 passes through polarizer 40, without effecting the polarization plane. Quarter wave plate 42 is adjusted so that an angle $\theta$ between the electrical field vector P of the incident linearly polarized beam and the quarter wave plate principal plane 42A is 45°. At this angle $\theta$, the beam 22 emerging from quarter wave plate 42 (scanning beam 22) is represented as being circularly polarized in the indicated clockwise direction. The beam 28 reflected from facet 24B is still circularly polarized, but in the opposite sense. The reflected beam is retransmitted into quarter wave plate 42. The beam 28' is again linearly polarized, but is now orthogonal to the original polarization. The beam, thus, cannot pass through polarizer 40 and is therefore extinguished. This combination of a polarizer 40 and quarter wave plate 42, with an angle $\theta$ equal to 45°, is opaque to the reflected beam from light striking normal to a facet such as facet 24B.

Figure 4:
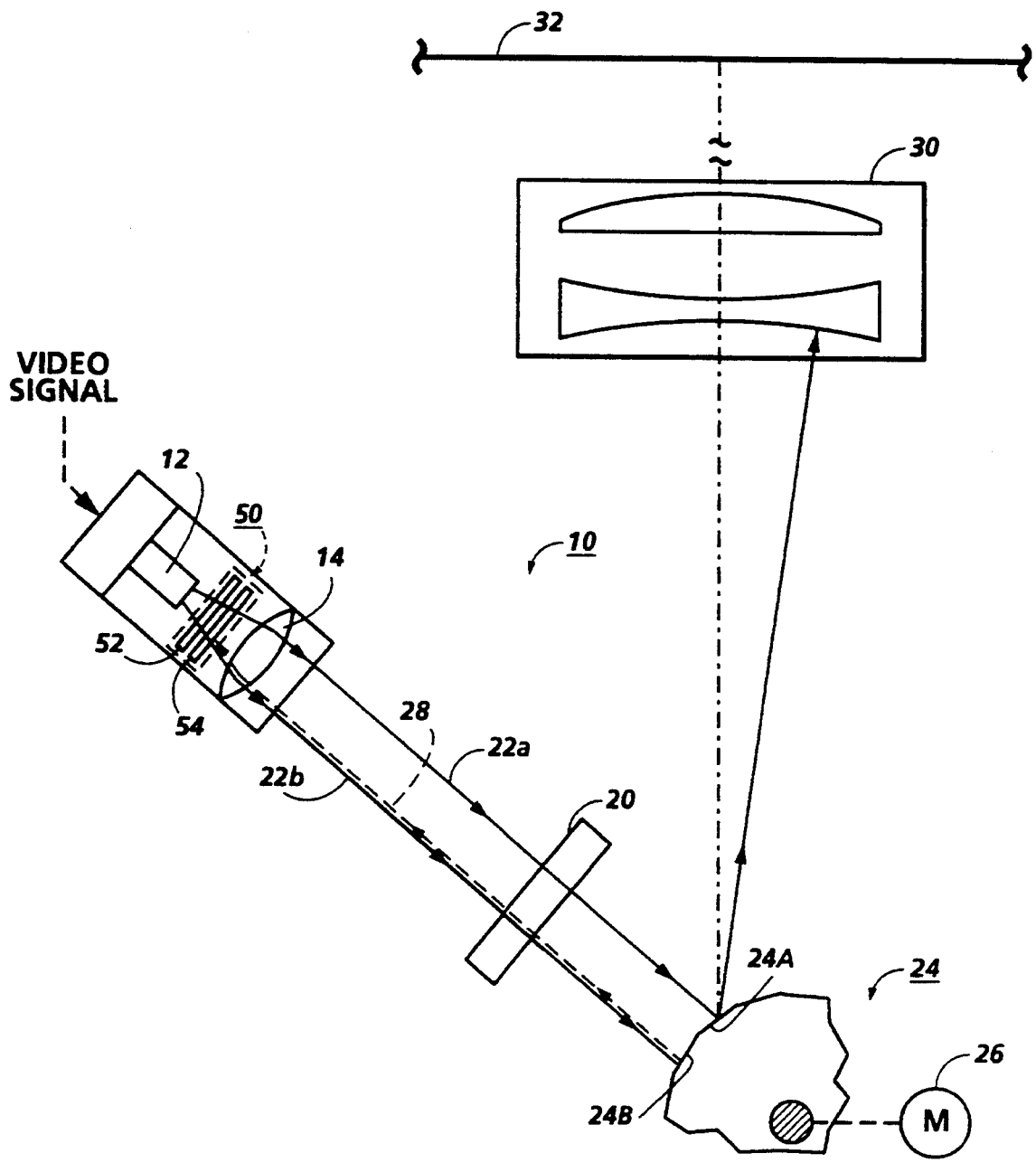
FIG. 4 shows a second embodiment of the optical isolator of the present invention.
Figure 5:
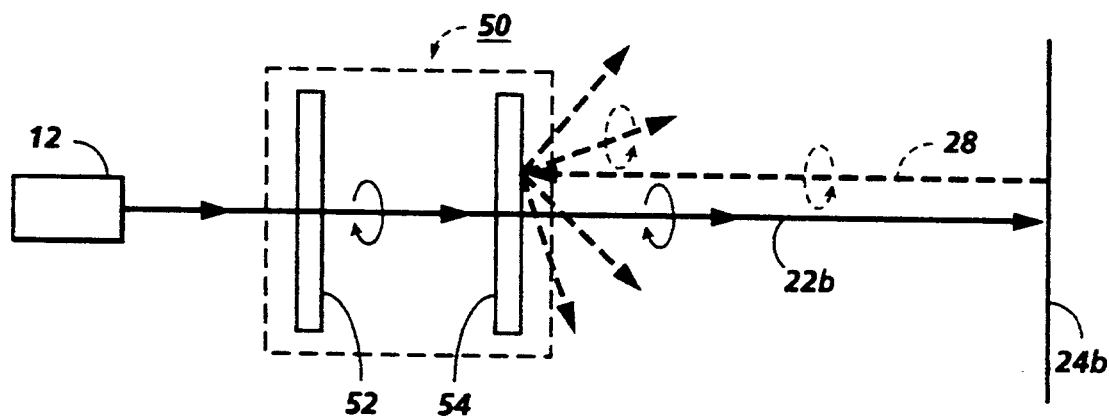
FIG. 5 shows the operation of the optical isolator of FIG. 4.
Figure 6:
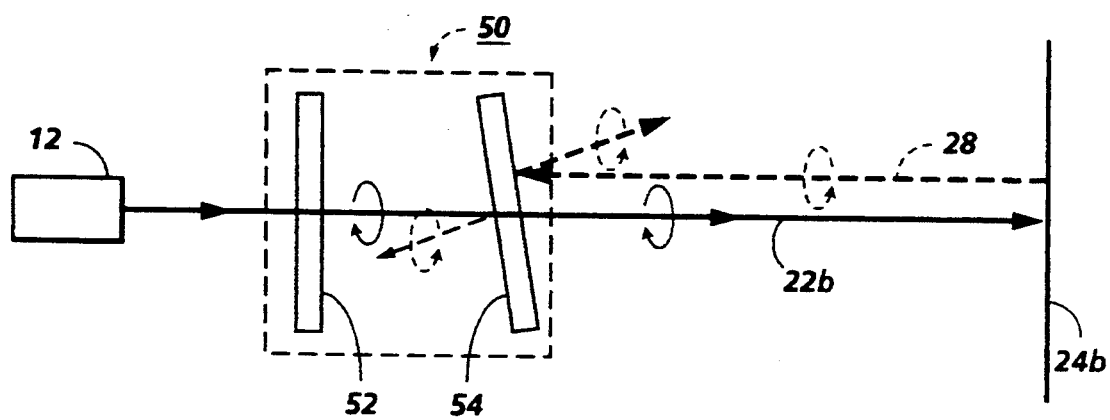
FIG. 6 shows an alternate operation of the optical isolator of FIG. 4.

Referring now to FIG. 4, there is shown a second embodiment of an optical isolator that utilizes liquid crystal technology. For a discussion of the appropriate liquid crystal optical effects see, e.g. S. D. Jacobs, et al., "Liquid Crystal Laser Optics: Design, Fabrication, and Performance," J. Opt. Soc. Am. B, Vol. 5, pg 1962, 1988. Optical isolator 50 comprises a birefringent liquid crystal quarter wave plate 52 and a cholesteric liquid crystal cell 54. The cholesteric liquid crystal cell 54 has the unusual property that it transmits light circularly polarized, in the same sense as the helical twist of the cholesteric, and reflects light of the opposite circular polarization. By the correct choice of birefringence of plate 52 and cholesteric cells of cell 54, circularly polarized light is transmitted through the two liquid crystal isolator elements with high efficiency. The operation of isolator 50 is shown in FIG. 5. Laser 12 output is linearly polarized and converted to a circularly polarized beam by wave plate 52. The wave plate 52 may be any crystalline or liquid crystalline, stretched polymer film or other birefringent material of the appropriate thickness. The circularly polarized beam is transmitted through cell 54. The specularly reflected light beam 28 returns along the beam path and is diffusely reflected from the cholesteric liquid crystal cell 54, because the circularly polarized light undergoes a 180° phase shift upon reflection that reverses its circular polarization sense. For maximum Stray light reflection, a specular reflection from the cholesteric is enabled by uniform surface alignment of the liquid crystals. For the embodiment shown in FIG. 6, cell 54 is tilted with respect to the optical path so that the reflection is diverted from the optical system.

The preferred location for isolator 50 is shown in FIG. 4 as between the laser and the collimator (or between the laser and the beam expander for the gas laser case). In this case, the preferred waveplate 52 is a birefringent liquid crystal. This location takes advantage of the wide angular acceptance (>20°) of both the liquid crystal plate 52 and cell 54, and permits very small sizes making the wavefront distortion tolerance easier to achieve. However, isolator 50 could also be located in a collimated beam path, as was the case for isolator 16. This location permits the isolator to be more simply mounted on the same assembly as the collimator and guarantees the highest isolation. The disadvantage is that the liquid crystal cells would be large clear apertures in the order of 10-20 mm, thus increasing the difficulty of achieving the wavefront distortion tolerances.

While the invention has been described with reference to the structures disclosed, it is not confined to the details set forth, but is intended to cover such modifications or changes as they come within the scope of the following claims.

We claim:

1. An optical scanning system which compensates for unwanted stray light reflections in an overfilled polygon design comprising:

a source of high intensity modulated, polarized, collimated light beams, a polygon scanner having a plurality of light reflecting facets interposed in the optical path between said light beam source and a light sensitive medium, one of said facets being fully illuminated by focused light beams to produce scanning beams which are reflected towards a light sensitive medium while adjacent facets are at least partially illuminated and reflect at least a portion of the light incident normally thereon as stray light in a reverse direction along said optical path, means for focusing said scanning beams reflected from said fully illuminated facets upon the surface of said light sensitive medium, and isolator means positioned in the optical path between said light beam source and said polygon scanner to prevent the passage therethrough of said stray light being reflected back in a reverse direction, from said polygon scanner, along the optical path.

2. The scanning system of claim 1 wherein said isolator means comprises a polarizer which transmits collimated linearly polarized light incident thereon, or polarizes randomly polarized light incident thereon, having a characteristic electric field vector, and a quarter wave plate having its principle plane aligned at a 45° angle to said field vector, whereby said plate causes the incident linearly polarized light from the polarizer to be circularly polarized and the incident circularly polarized stray light reflected from said facet to said plate to be changed back into a linearly polarized light, but with its polarization direction perpendicular to the polarizer, causing the light to be blocked by said polarizer.

3. The scanning system of claim 1 wherein the light source includes a diode laser and a collimating means for collimating the output of said laser and wherein said isolator means is located between said laser and said collimating means.

4. The scanning system of claim 3 wherein said isolator means comprises a birefringent quarter wave plate and a cholesteric liquid crystal cell which converts the polarized light source output into a circularly polarized beam, whereby the circularly polarized stray light reflected back along the optical path is reflected from the cholesteric liquid crystal cell.

5. The scanning system of claim 4 wherein said liquid crystal cells have uniform surface alignment and wherein said cell is tilted with respect to the optical path so that the stray light is specularly reflected.

6. The scanning system of claim 4 wherein said isolator means is positioned between the collimating means and the polygon scanner.

7. The scanning system of claim 1 wherein said light beam source includes a gas laser.

* * * * *